United States Patent
Hasegawa et al.

(10) Patent No.: US 9,536,561 B1
(45) Date of Patent: Jan. 3, 2017

(54) WRITING DUMMY INDICES ON A TAPE MEDIUM PARTITION

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/962,397

(22) Filed: Dec. 8, 2015

(51) Int. Cl.
  *G11B 20/12* (2006.01)
  *G11B 5/008* (2006.01)
  *G11B 5/09* (2006.01)
  *G11B 5/588* (2006.01)

(52) U.S. Cl.
  CPC ....... *G11B 20/1201* (2013.01); *G11B 5/00813* (2013.01); *G11B 5/09* (2013.01); *G11B 5/588* (2013.01)

(58) Field of Classification Search
  None
  See application file for complete search history.

(56) References Cited

U.S. PATENT DOCUMENTS

| | | | |
|---|---|---|---|
| 8,139,311 B2* | 3/2012 | Oishi | G11B 5/00813 360/60 |
| 9,053,745 B2* | 6/2015 | Abe | G11B 20/1201 |
| 2015/0127980 A1 | 5/2015 | Klein et al. | |
| 2015/0161161 A1 | 6/2015 | Iwanaga et al. | |
| 2015/0293935 A1* | 10/2015 | Abe | G06F 17/30073 707/611 |

FOREIGN PATENT DOCUMENTS

WO  98/44503 A1  10/1998

* cited by examiner

*Primary Examiner* — K. Wong
(74) *Attorney, Agent, or Firm* — Gregory M. Nordstrom

(57) ABSTRACT

A request for writing a first index information to a first partition of a serial storage medium of a serial system is received. The serial storage medium includes a first partition for writing the first index information including a first index position, a second partition for storing a data set, the data set including a second index information including a second index position, a memory for determining the second index position, and a module for writing the first index position. A beginning position of the first index is written on the first partition. A determination is made whether the beginning of the first index position is proximate to the second index position. In response to the beginning of the first index position being proximate to the second index position, an interrupted index position is registered. A dummy index is written to the first partition at the interrupted index position.

18 Claims, 6 Drawing Sheets

WRITING DUMMY INDICES ON A TAPE MEDIUM PARTITION

BACKGROUND

The present disclosure relates to physical storage of data, and more specifically, to writing a dummy index partitions on tape drives to prevent loss of data upon damage to the tape.

Digital data may be stored on physical media like magnetic tape drives. Digital data stored on magnetic tape may be more secure, or easier to recover in an event of a failure, compared to data being stored on a magnetic disk. Magnetic tape may be easier to transport and transfer from one user to another through a physical exchange of the medium than hard disk drives. The types of magnetic tape digital storage medium may include, open reels, cartridges, and cassettes each of which may be different widths and/or lengths depending on the storage environment.

SUMMARY

According to embodiments of the present disclosure, a method, a system, and a computer program product are provided for writing data set storage index on a tape drive. The data storage index may be written to an index partition, which indices a data set or a backup index written on a data partition. To protect a loss of data, a dummy index may be written within the index partition where if the tape incurs damage only one index or data set may be lost. The dummy index may be written in response to a proximity of a data set or backup index and the index to be written.

A method is provided for storing data on a storage medium. A request for writing a first index information to a first partition of a serial storage medium of a serial system is received. The serial storage medium includes a first partition for writing the first index information; the first index information includes a first index position. The serial storage medium includes a second partition for storing a data set, the data set including a second index information; the second data set includes a second index position. The serial storage medium includes a memory for determining the second index position, and a module for writing the first index position. A beginning position of the first index is written on the first partition. A determination is made whether the beginning of the first index position is proximate to the second index position. In response to the beginning of the first index position being proximate to the second index position, an interrupted index position is registered. A dummy index is written to the first partition at the interrupted index position.

A system is provided for storing data on a storage medium. The system includes a memory, a processing unit, a storage system, and a tape controller, which are communicatively coupled. The storage system includes a serial storage medium. The serial storage medium includes a first partition for writing the first index information; the first index information includes a first index position. The serial storage medium includes a second partition for storing a data set, the data set including a second index information; the second data set includes a second index position. The serial storage medium includes a memory for determining the second index position, and a module for writing the first index position. The tape controller is configured to write a beginning position of the first index on the first partition. The tape controller is configured to determine whether the beginning of the first index position is proximate to the second index position. The tape controller is configured to register an interrupted index position, in response to the beginning of the first index position being proximate to the second index position. The tape controller is configured to write a dummy index to the first partition at the interrupted index position.

A computer program product is provided for storing data on a storage medium. The computer program product includes a computer readable storage medium, having a computer readable program. The computer readable program is executed on a computing device. The computer readable program is configured to receive a request for writing a first index information to a first partition of a serial storage medium of a serial storage system. The serial storage medium includes a first partition for writing the first index information; the first index information includes a first index position. The serial storage medium includes a second partition for storing a data set, the data set including a second index information; the second data set includes a second index position. The serial storage medium includes a memory for determining the second index position, and a module for writing the first index position. The computing device is configured to write a beginning position of the first index on the first partition. The computing device is configured to determine whether the beginning of the first index position is proximate to the second index position. The computing device is configured to register an interrupted index position, in response to the beginning of the first index position being proximate to the second index position. The computing device is configured to write a dummy index to the first partition at the interrupted index position.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
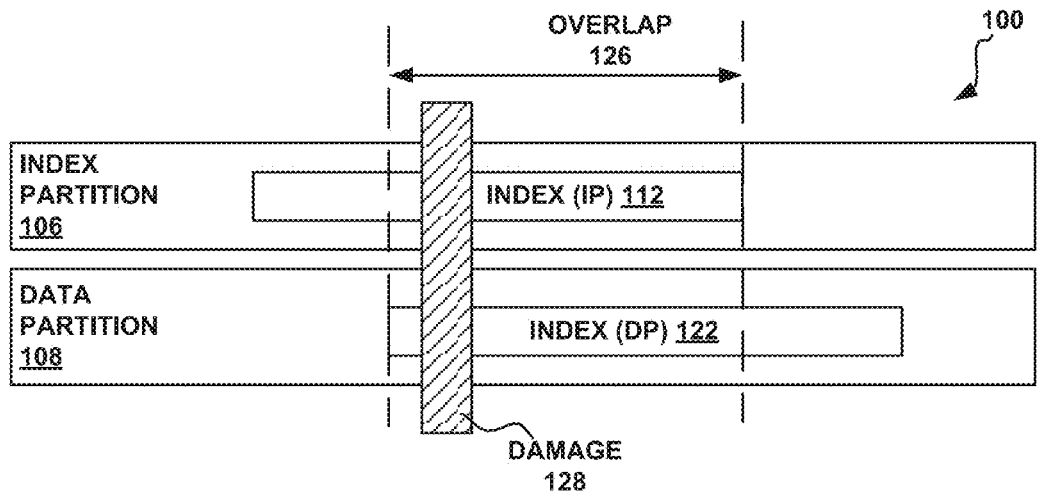
FIG. 1A depicts a linear tape file system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data recording, more particular aspects relate to avoiding a data loss even caused by a single damage event to a tape storage medium (hereinafter, "tape medium") such as may be used with a tape drive storage system. Digital data may be written on a tape medium, which may be formatted as a file in a linear tape file system (LTFS). To prevent a total data loss of a data set (file), a "dummy index" (e.g., a pattern of data not having any significance, otherwise, for retention) may be written in an index partition of the tape medium. The dummy index may be written to the index partition (IP) when a file stored on data partition (DP) is within a distance proximate to a beginning of a referencing index of the file. While the present disclosure is not necessarily limited to such applications, various aspects of the disclosure may be appreciated through a discussion of various examples and embodiments using this context and do not limit the disclosure.

Damage incurred to the tape of a magnetic tape storage system may render the data stored on the damaged section of tape unreadable. In an LTFS, the tape may be formatted into an index partition and a data partition, each parallel to the other on the tape media, and storing data serially in the direction of tape motion within a tape drive. The index partition may include data set storing indices, which a user may select, using an LTFS user interface, to access a file stored on a data partition. The IP may be a first partition of the tape medium, and the DP may be a second partition of the tape medium. The index may reference a single data set (DS), or file, that is stored in a DP. The DS may include a single piece of data to a collection of related data based that may be stored and referenced together as a file. For example, a collection of related data may include a table of weather for a city for each month. The data set may alternatively be a partitioned data set including multiple data sets each including a sub-data set. Index information (index) may include metadata of a file stored in the data partition, and the index may be used to access the file. If physical damage is incurred on the tape, and the damage occurs to a region of the tape that includes both the index and the file, then the index and file may both be inaccessible. To prevent physical damage causing total loss of the file and the index of the file, a distance threshold (threshold distance) of a proximate distance between a beginning of an index to be written on the IP and a data set or backup index stored on the DP. The distance threshold of the proximate distance may be incorporated such that if the index is to be written within the threshold of the file. If the distance between the file and the index is within the threshold, then a dummy index may be written. If physical damage happens to the tape, then only the index, or the dummy index and the file, may be damaged.

A proximate distance may be determined by a threshold of a distance. The proximate distance threshold may be determined based on a width of tape and/or a tape drive performing the read/write functions on the tape drive. The wider the width of the tape the more data may be stored in a shorter length. For example, a tape medium with a width of 10 cm (centimeters) wide may have a larger proximate distance than a tape medium with a width of 5 cm wide. In an additional example, if a tape drive includes multiple wraps where the tape medium of the tape drive passes by itself, then the tape drive may determine locations were a written DS might be within a proximate distance (overlap) with a current position of the index. If the index to be written on the IP within a proximate distance with the DS the index is indexing, then the dummy data may be written creating a spacing and writing the index outside the proximate distance.

In various embodiments, the tape medium of a tape storage system may be a serial storage medium of a serial storage system. The tape medium may store data serially (sequentially) where one data set follows a previously written data set on the tape medium. The tape medium may be the tape of the tape medium and the tape storage system may be a tape drive or tape reading device capable of reading/writing data on the tape.

The LTFS storage architecture enables a tape medium to be utilized via a file system as if the tape medium were a hard disk drive (HDD) or flash memory. In utilizing the tape medium with an LTFS, the tape medium may be divided into two indices including an IP and a DP. The IP may be used to write the latest index (e.g., a set of metadata for each data set) and the DP may be used to write the body of the data set and the history of the index.

After writing of the body of a data set in the DP of the tape media the index information (index) may be written into the IP. If the index, including the metadata associated with the data set, cannot be written to the tape medium (for example, due to a loss of power to the tape drive) it may not be possible to access the data set. Metadata indicative of the name of the data set may not exist, then, on the tape medium, even though the body of the file as such is written on the tape medium. In order to avoid such a state, a feature (operation) called "Periodic Sync" may be provided.

The periodic sync operation may depend on where the index is written on the tape medium. The periodic sync operation may be performed at a predetermined time after the data set has been written. For example, an index may be written every five minutes in the standard operations of the tape storage system. In a periodic sync operation, if the index is written to the IP while the file is being written to the DP, there may be an increase in the time required for writing both to the medium due to the time required to move the media between the partitions. In view of this, the index may be written in the DP as part of the periodic sync. On the other hand, when the tape medium is to be ejected from the tape drive, the LTFS format may require that indices having the same content be written to both the DP and the IP. In order to distinguish the latest index from the previous indices, a version number called a "generation" may be assigned to each index. The generation may be incremented each time an index having new information is written. The size, or length, of the index depends on the data amount of each metadata, including the length of the file name. In an example, the length of the index may be the order of one kilobyte per a file (e.g., one gigabyte per one million files).

A table may be incorporated for managing a generation, or generations of indices, that may be written on a newly created index of a non-volatile memory or storage. The non-volatile memory may be a cartridge memory (CM) which may be a flash memory storing the locations of partitions and positions of written data on the tape drive. The CM may a component of a tape cartridge containing the tape medium. The CM may be formatted as a tape memory using LTFS to store information regarding locations of indexes stored on the IP of the tape medium. The CM (tape memory) may contain information about the start and end locations of the IP on the tape medium, positions of the indexes (index positions) stored on the IP, and the start and end locations of the DP on the tape medium. The index positions may be recorded within the CM such that a tape drive may read the memory of the CM to determine the location of the beginning of each of the indexes stored on the IP. The indexes on the IP may then instruct the tape drive of the location the DS of the index as well as any meta data stored within the index. The information on all of the generations may be held in the CM. Meanwhile, since a particular index of the IP may be overwritten every time the index is changed, or updated, only the latest generation, or several most recent generations may be held in the CM. For purposes of understanding the disclosure, example embodiments of the disclosure are considered to implement only holding the information on the latest generation. Nevertheless, it should be appreciated that other implementations are in no way excluded from embodiments.

The structure of an LTFS with a latest generation held IP may be partitioned as follows in the example. A generation of an index partition may include a beginning position (on the medium) of an index position in the IP, an interrupted index position in the IP, a restarted index position in the IP, the index, and an end of the index position in the IP. The interrupted index position may include pausing the writing of the index to include a dummy index based on a determination that a DS of a DP is within a proximate distance to the beginning position of the index. The IP may then be followed, serially on the medium, by the DP, including the beginning of an index position in the DP and the end of the index position in the DP. It is assumed, in the example, that the index of the new generation may be written first to the data partition (DP), and then the index of the same generation may be written to the index partition (IP) as in the example implementation. The information on the writing of the index interrupt/restart positions may only be held in the index in the IP. It will be appreciated that, if the data is to be written in any predetermined order; the data structure may need to ensure that the index write interrupt/restart positions can be held for both of these indices.

In various embodiments, the interrupted index position and the restarted index position may not be written to the IP for every index. If the index is not within a proximate distance to the data set or the backup index written on the DP, then the writing of the index may not be interrupted. If the writing of the index is not interrupted then the restart operation may not be required. For example, if the index is not a distance proximate to data set or to the backup index of the DP, then the writing of the index on the IP may proceed by writing the beginning index position, the index, and then the end of the index.

In various embodiments, the IP and/or DP may be encrypted using an encryption key. Encryption may include encrypting the data stored on the tape medium. The encryption key may be stored within a house keeping data set (HKDS) which stores encryption keys. The data may be written with the encryption key converting the data to be unreadable unless the user or system owns the encryption key. The encryption key may be hosted within a tape drive, or system configured to operate the tape drive, and may be used to decrypt the encrypted IP and/or DP of the tape medium. The Encryption key may protect the tape medium in an occurrence of a theft of the physical media. For example, if a theft of the tape medium was to occur, unless the thief had system with the encryption key, then the thief would be unable to understand the encrypted data.

FIG. 1A depicts a linear tape file system including data indices stored in an index partition and a data partition of a tape drive incurring damage to the tape, according to embodiments of the present disclosure. The LTFS tape 100 includes an IP (index partition) 106, which further includes an IP index (INDEX (IP)) 112 written in the IP. The LTFS of tape 100 also includes a DP (data partition) 108 wherein a DP index (INDEX (DP)) 122 is written to the DP. The IP index 112 and the DP index 122 may be the same, referencing the same dataset, and/or the DP index may be a backup of the IP index. The DP index 122 of the DP 108 may be indices of a data set (file) stored on the DP 108. In various embodiments, the DP index 122 may be a DS written to the DP 108 that the IP index 112 is indexing.

An example write procedure may include writing the first index to the IP following a data set being written to the DP. A tape drive may write a first DS on a DP of a tape medium. Upon writing the first DS to the DP, a backup index may be written to the DP. A determination (i.e. a periodic sync operation) may be made to write an index of the first DS to the IP, and the first index may be written to the IP following a previously written index. In some embodiments, the writing of the first index to the IP may occur immediately after the DS is written to the DP.

The data written on the tape storage device may be affected by physical or other forms of damage, such as shown by damage 128, and the data written on a particular part may not be readable in some cases. In an implementation of LTFS, the IP index and the DP index may be independently written. Therefore, in some cases, both of the first index and the backup of the first index may be written on parts of the tape, which may be physically close to each other as illustrated by the overlap 126. If the tape incurs damage 128, both the IP index 112 and the DP index 122 may be damaged. If both the IP index and the DP index are damaged, then the index to the data may be lost and may not be recovered.

Figure 1B:
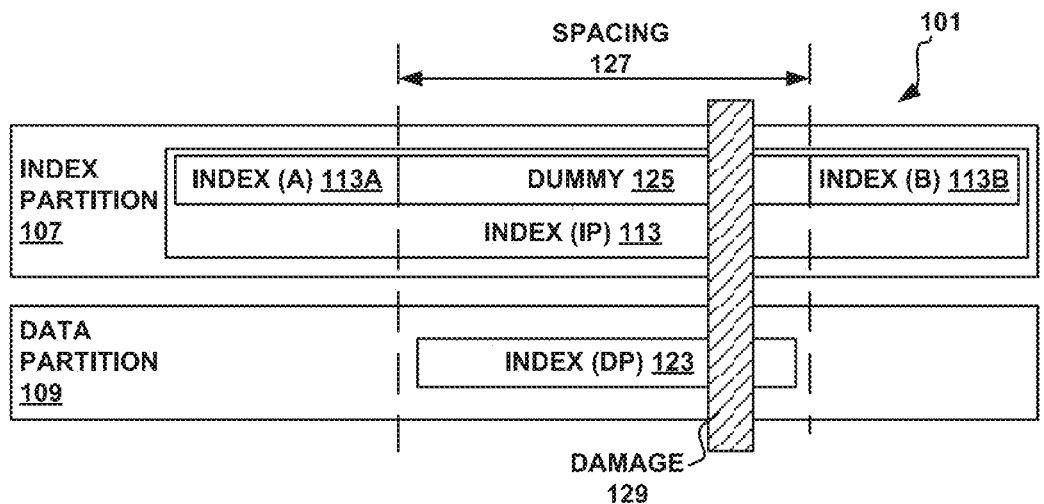
FIG. 1B depicts a linear tape file system including a dummy index, according to embodiments of the present disclosure.

FIG. 1B depicts a linear tape file system including data indices, and further, including a dummy index written on an index partition, the tape medium incurring damage to the tape, according to embodiments. To prevent a loss of both an IP index 113 and a DP index 123 the LTFS tape 101 may also include writing dummy data (DUMMY) 125, which is a portion of data upon a proximity determination, to the IP 107 creating a spacing 127. The dummy data 125 may be interposed between a first portion of a first index (INDEX (A)) 113A and the second portion of a first index (INDEX (B)) 113B. The dummy data 125 may spanning a region, as the spacing 127, may prevent a loss of both the IP index and the DP index if a damage 129 was to occur.

The combination of the first portion of the first index 113A, the dummy data 125, and the second portion of the first index 113B may result in a first IP index 113. The dummy data 125 may be written on the determination that the DP index 123 is within a proximate distance to the first IP index 113. For example, the writing of the IP index 113 may include a beginning portion and interrupted portion written to the first portion of the first index 113A. Following the interrupted portion dummy data 125 may be written until the DP index is determined not within the proximate distance, and the second portion of the first index 113B may be written. The second portion of the first index 113B may include the restarted portion, the index, and the index end.

To prevent the first IP index 113 and the first DP index 123 of the data from being both damaged by the damage 129 occurring to the tape medium, the dummy data 125 may be written into the IP 107 and creates a spacing 127. The spacing, and corresponding length of the dummy data 125, may be chosen of a particular length based on the proximate distance to protect the first IP index 113 and/or the first DP index 123 from being damaged when damage 129 is incurred. The particular length of the dummy index 129 may be determined based on an overlap of the first index 113 and first backup index 123. For example, if the first index 113 and backup of the first index would overlap by 2 cm, then a dummy index may be written such that it is 2 cm or greater in length on the IP of the tape medium. In the example of FIG. 1B, the damage 129 may result in causing the first DP index 123 of the DP 109 and the dummy data 125 of the first index 113 of the IP 107 to become unreadable. The dummy data 125 may protect the first index 113 from damage, when compared to damage 128 shown in FIG. 1A, where both the first index 112 and the backup of the first index 122 are damaged.

A computing system may determine that a first index would be written within a proximity, physically too close, to a backup of that first index. For example, magnetic tape media may be subject routinely to damage of a particular size and the proximity may be a region of the tape media within that particular size. If the backup of the first index would be too close to the first index, then dummy data, such as the dummy data 125 of FIG. 1B, may be written into an IP such as IP 107. Writing such dummy index is described further herein.

Figure 2:
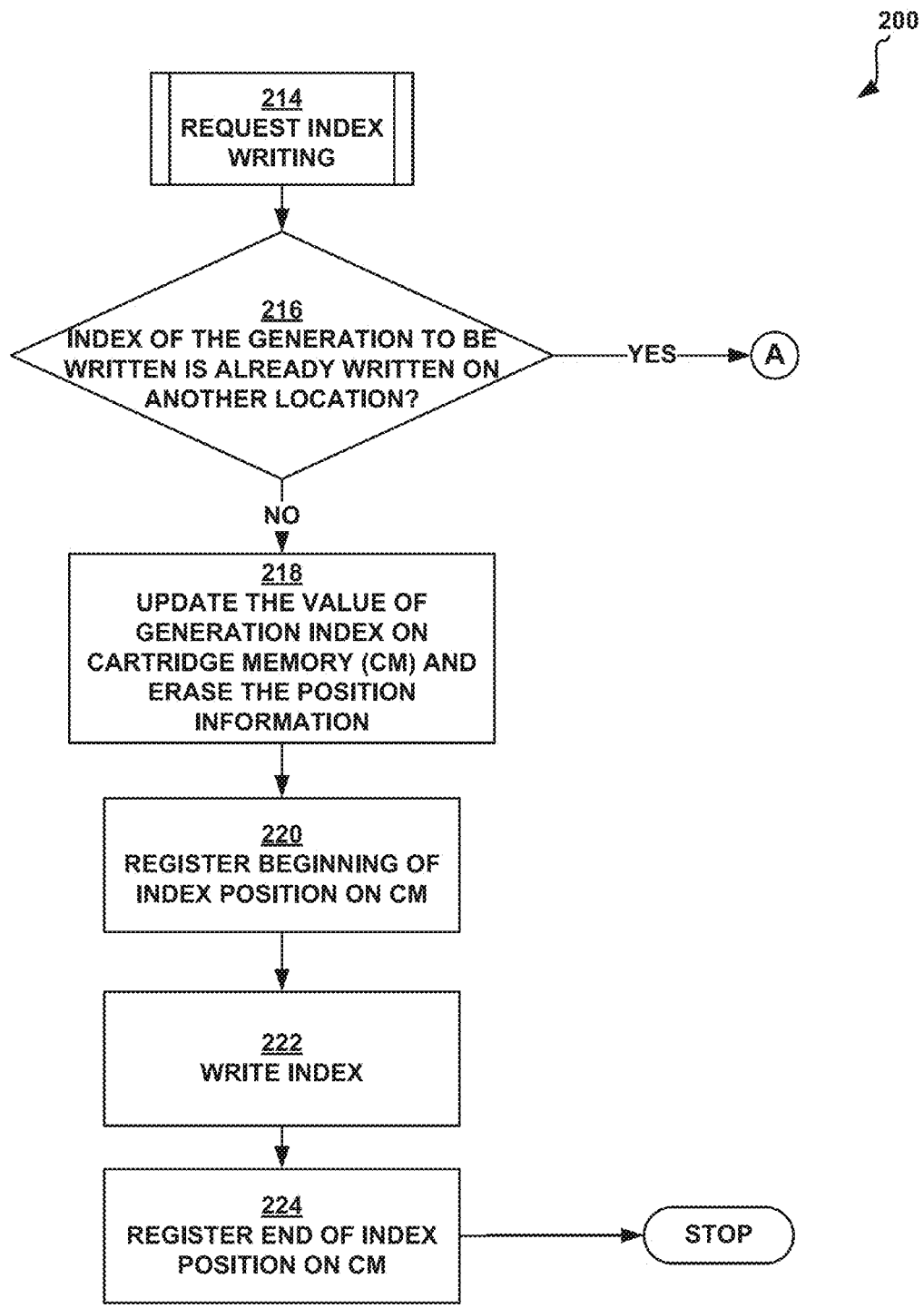
FIG. 2 depicts a method for writing an index, according to embodiments of the present disclosure.

FIG. 2 depicts a method for writing an index, according to embodiments. A method 200 may be performed upon the determination that a data set and index is to be written to the DP are within a proximate distance of each other. The method may performed by a tape controller. The indexing (writing of the index on the IP) may be performed after an ejection command is issued, according to a time period (periodic sync), and/or may be performed by another function managing data on the tape medium. For example, the ejection command may be in preparation for removing the tape from a tape drive, where before the tape may be removed from the drive, any queued indices may be written into an IP. In an additional example, a periodic sync may be issued to occur every 5 minutes, and applied relative to each time that the system may search the DP for data or indices requiring indexing and index the data on the IP.

In operation 214, the tape controller may receive a request for index writing. The request for index writing may include a function determining that one or more files require indexing. The tape controller may determine that a first file requires an index to be written on the IP. Upon receiving the request for indexing a file, the tape controller may be provided, or determine, the location of the file and possible index of the file stored on the DP.

In operation 216, the tape controller may determine if the index to be written into the IP is already written on another location. Another location may include the DP where a backup copy of the index may already be written. If the index to be written is not already in another location, then the tape controller updates the generation index, at 218. If the index to be written is already in another location, then the tape controller may perform another aspect of the disclosure, "A," illustrated in FIG. 3.

In operation 218, the tape controller may update the value of the generation index on the cartridge memory (CM) and erase the position information. The generation index may include generating the size and location of the index on the IP. The tape controller may select a position is in the IP of the tape and the generation index may correspond to a beginning position of the index on the IP.

In operation 220, the beginning of the index is registered on the CM. The index may include a start position as to which the index may be written as a beginning of the index. In operation 222, the index is written on the IP. In operation 224, the tape controller registers the end of the written index on the CM and completes the method 200. The end may include an end position as the end of the written index.

Figure 3:
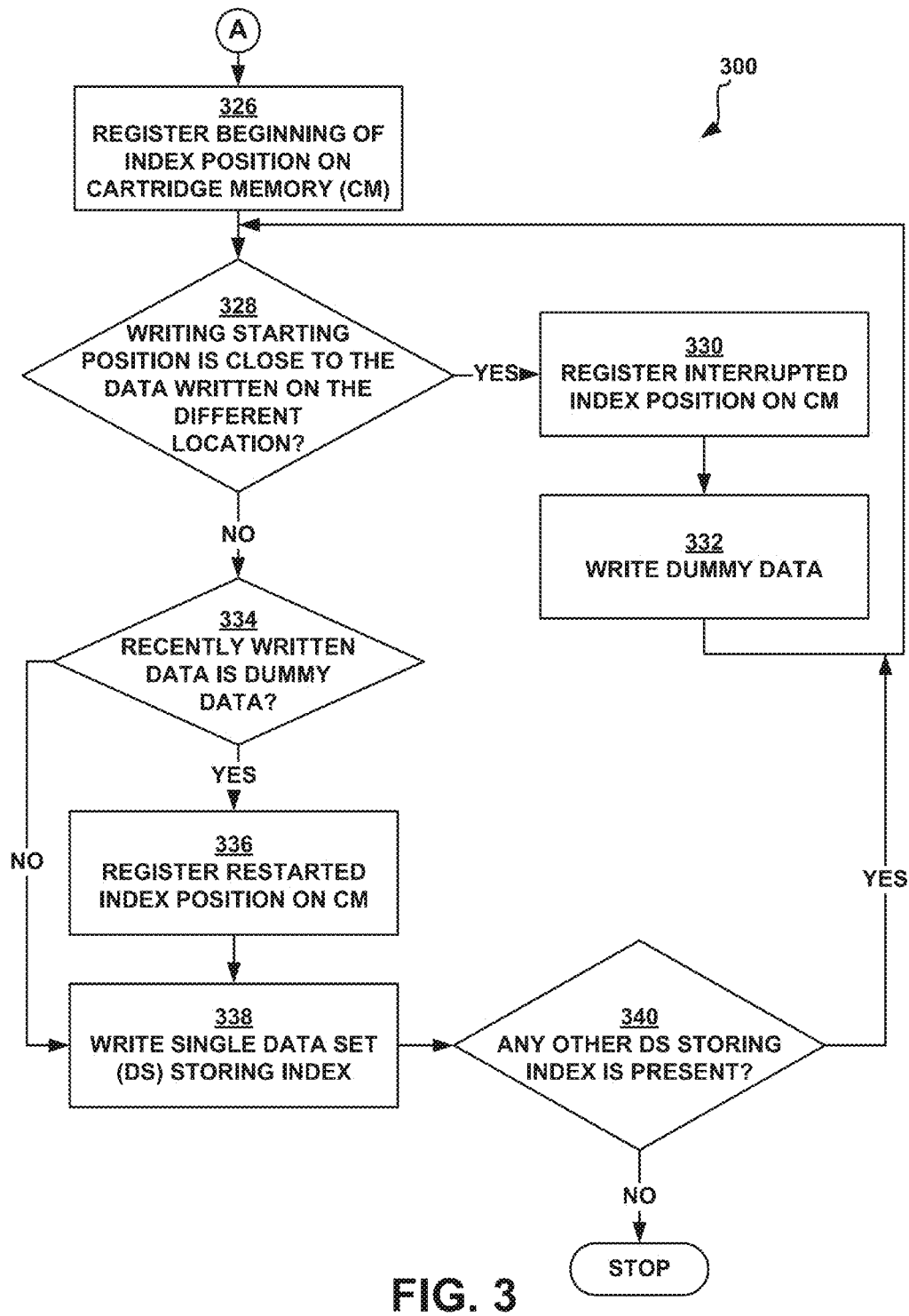
FIG. 3 depicts a method for writing an index on an index partition, according to embodiments of the present disclosure.

FIG. 3 depicts a method 300 for writing an index on an index partition in response to a backup index or data set already being written on the data partition, such as may be determined at 216 of FIG. 2, and according to embodiments. An index may be written on the IP in response to data set or a backup index already written on the DP. For example, the IP may receive a write operation on the tape medium in reference to data or a backup index on the DP. For the purpose of simplification, data and backup indices written on the DP may be treated similarly and referred to as the data on the DP.

In operation 326, the beginning of the index position is registered on the CM of the IP. The beginning of the index position may be registered on the CM of the tape drive on the IP at the end of previously written indexes. The beginning position may be the start of the index to be written on the IP. The beginning position of the index may be followed by an interrupted position or the index depending on a proximity (within a proximate distance) of a backup index or DS the index to be written is indexing.

In operation 328, a determination is made depending on the starting position of the index on the IP and the data on the DP. If the starting position of the index on the IP is within a proximate distance to the data of the DP, then the method may progress to operation 330. A proximate distance may be determined based on the tape drive and how the LTFS tape is read/written, started, and/or taken up. For example, a proximate distance may be determined by an index of the IP being within a fixed distance on the tape away from the data set or backup index written on the DP. When writing the beginning of the index, if the index on the IP will be within the fixed distance of the data set or backup index, then a dummy index may be written. If the fixed distance is 10 cm (centimeters) and the beginning of the index is 9 cm away from the data set stored on the DP, then dummy index may be written until the index will be more than 10 cm away from the data set.

In various embodiments, if the tape drive has multiple wraps of data bands, then the proximate distance may be much larger than a single wrap data band. The proximate distance may be determined by a user or by a system, and may be configurable based on the type or model of the tape drive. For example, a tape drive may contain six wraps of data bands passing in close proximity to each other. The proximate distance for the tape drive with six wraps may contain six time the proximate distances as a single wrap data band. The proximate distances may be determined by the points where the index of the IP would come in an overlapping proximity of the data set or backup index partition. The tape controller may have access to the CM, which may store a set of proximate distances. The set of proximate distances may include one or more upper and lower distance thresholds of the proximate distance. If the index to be written on the IP is within the any of the upper and lower distance thresholds, the dummy index may be written until the index is outside all of the upper and lower distance thresholds.

In operation 330, an interrupted index position may be registered on the CM. The interrupted index position may be a result of the index to be written being a proximate distance (too close) to the data or backup index of a DP. The interrupted index position may not include the written index until after the dummy index has been written.

In operation 332, the dummy index is written starting at the interrupted index position and ending at a predetermined distance or amount of data. The Dummy index may fulfil a space consumption purpose for creating a spacing between the index to be written and the data set stored on the DP. The data written as the dummy index may be unreadable or a random collection of numbers and characters to which may serve no purpose as an index or part of an index. The dummy index may be written after the interrupted position of the index. For example, the dummy index may be a 512 KB (Kilobyte) portion of data, and may have a fixed length on the tape of the CM. For example, if the tape is 1 $GB/in^2$ (gigabyte per square inch the dummy index may be a space of $0.000512 in^2$ (inches) in size. Upon completion of writing the dummy index, the tape controller may, in operation 328, determine again if the starting position is too close to the data of the DP. If the starting position of the index on the IP is still too close to the data of the DP then dummy index may be repeatedly written until the index of the IP is not within the distance proximate to the data of the DP.

In operation 334, a determination is made if dummy index was recently written to the IP. If the tape controller, in operation 332, wrote a dummy index and/or the data most recently written to the IP is a dummy index, then a restart index position may be required. In operation 336, the tape controller registers a restart index position on the CM. If, in operation 334, the tape controller determines that the recently written data is not a dummy index, or at 336 the tape controller registered a restart index position on the CM, in operation 338, the tape controller writes the restart index preceding (on the media) the index in the IP.

In operation 336, a restarted index position is registered on the CM of the IP. The restated index position indicates that the index includes a dummy index written between the interrupted position and restarted position of the index. Between the interrupted position and restarted position, one or more dummy indices may be written depending on the determination of the distance of proximity of the data set or backup index on the DP.

In operation 338, a single data set storing index is written to the IP. The writing of the single data set storing index may include an end to the writing of the data set index. The end of the data set index may indicate a position as to which a next data set index may be written. The data set storing index may be written between the restarted position and the end position. An index may include, for example, the following positions: a beginning, an interrupted, a restarted, and the end.

If the recently written data was a dummy index, then a restarted index position may be merged with the beginning position and the dummy data before writing the DS storing index. The beginning position and the dummy data may be a first portion of the index, and the index and an end may be a second portion of the index. For example, a beginning position of a first index may within a distance proximate to a second index position of a DS stored on a DP. The beginning position may be written and registered to the CM and the dummy data may be written until the index to be written will no longer be within a distance proximate to the DS stored on the DP. Upon the completion of the writing of the dummy data (dummy index) portion of the index, a restarted index position may indicate a second portion of the index where if the index was to be read, the CM may use the restarted index position as a "beginning" of the index. After the restarted index position is registered, the index may be written to the IP and an end may signify on the CM that the index is complete.

In operation 340, another data set storing index is determined for writing. If there is not another data set storing index to be written, then the tape controller completes performing the method. If there is a second data set storing index to be written, then the tape controller may repeat 328 through 340. The second data set storing index may be written after the previously written first data set storing index. The tape controller may repeat the method 300 until all data set storing indices are written.

Figure 4:
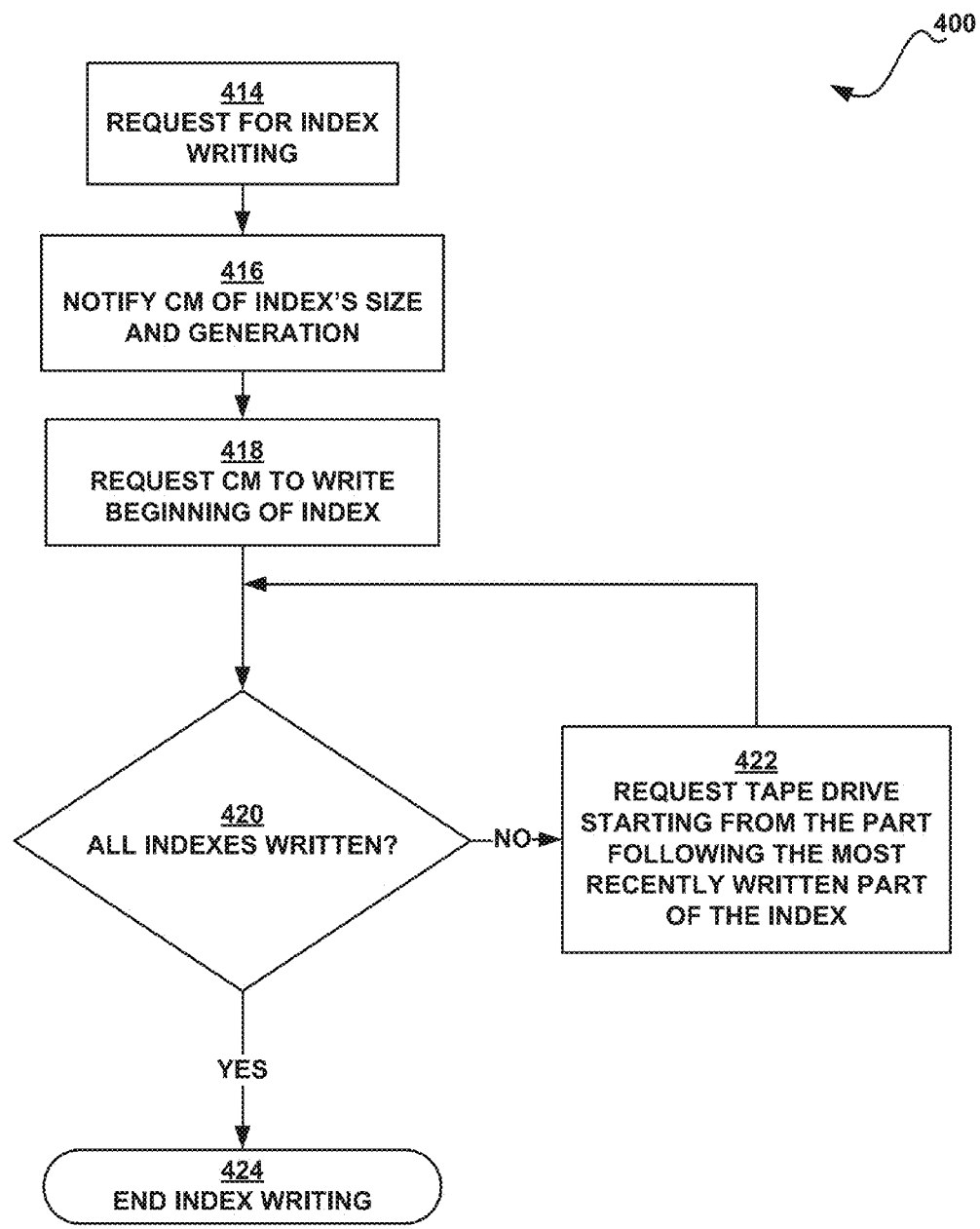
FIG. 4 depicts a method for receiving a request for writing an index, according to embodiments of the present disclosure.

FIG. 4 depicts a method 400 for receiving a request for writing an index, according to embodiments. Receiving the request may include an index to be written on the IP. The method includes a request for writing an index. The index may be positioned, on the media, following a previously written index, which may include an end position.

In operation 414, a request for an index to be written is received. The request may include a data set written to the DP that requires indexing on the IP. The data set may include data or files stored on the DP. The request may be issued from a computing device or may be a result of a periodic sync.

In operation 416, the CM is notified of the size of the index and the generation of the index on the IP. The tape of the CM may be positioned such that the IP is available to be written upon the tape following the most previously written index. The position of the IP may also include the end of the most previously written index. The size of the index may be generated based on the data set stored on the DP. A data set storing index may be generated as an index to be written on the IP.

In operation 418, the CM receives a request to write the index. The index may include a beginning position, the index, and an end position. The index may be for example, a 512 KB index starting at the beginning position and completing at the end position. The 512 KB size may be a maximum size for an index. The data set storing index may then be written to the IP and the tape may be positioned at the end of all of the indices written to the IP.

In operation 420, a determination is made if all of the indices have been written to the IP. If another index is available to be written, then at 422 the tape controller may process a new request to write an index. Alternatively, if all of the indices have been written to the IP, then, in operation 424, the tape controller ends writing the indices and completes performing the method.

In operation 422, an additional request is made for the CM to write a second data set storing index of a second data set. Following the previously written first index, the second data set storing index may be written. The second data set storing index may begin after the end of the first data set storing index. The second data set storing index may be written, and an end may be issued after writing. In operation 420, another determination may be made if all of the indices have been written. If not all have been written, the tape controller may repeat 422 and 420.

Figure 5:
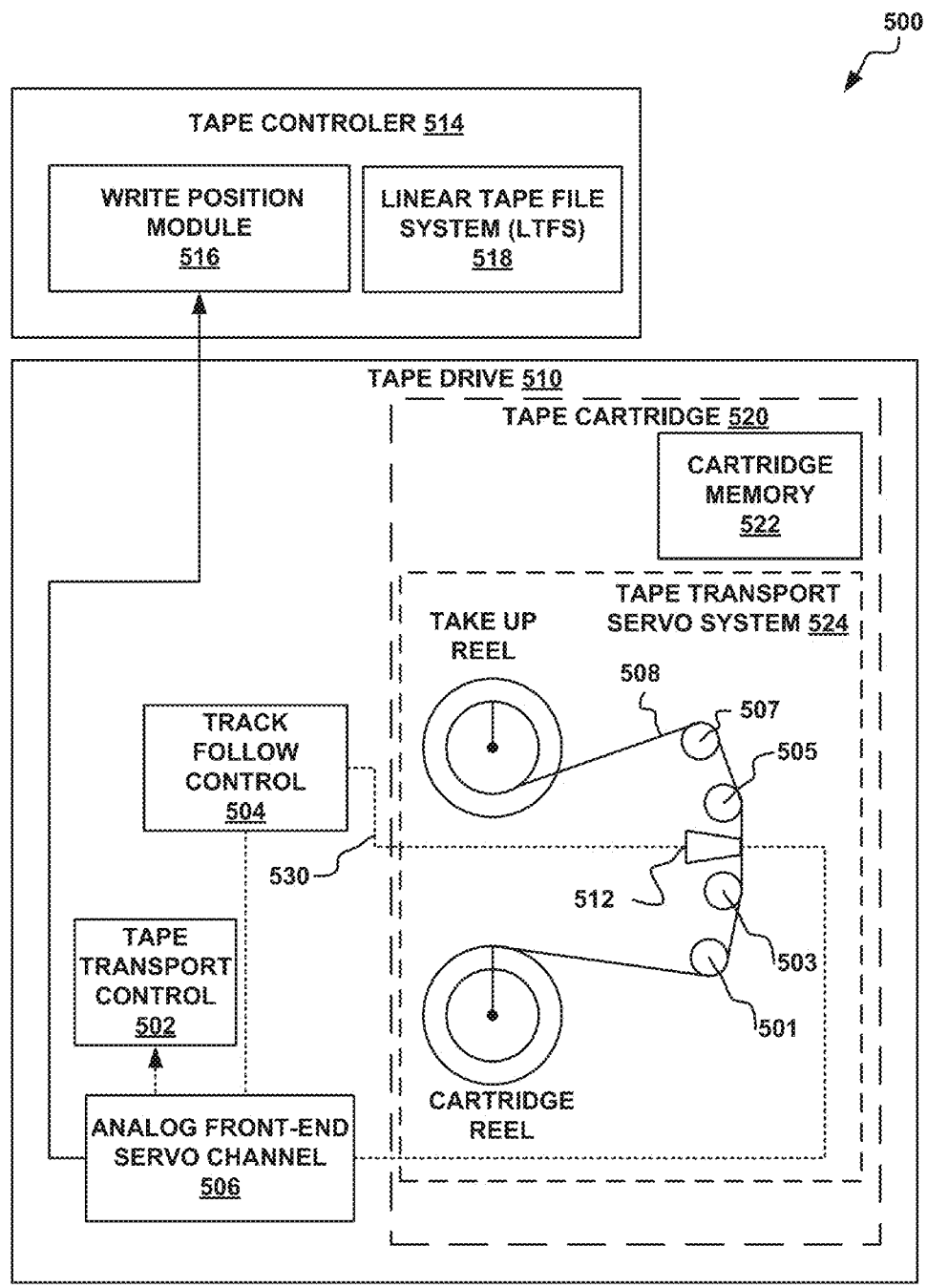
FIG. 5 illustrates a system used for determining write positions of data and indices on the tape cartridge, according to various embodiments.

FIG. 5 illustrates a system used for determining write positions of data and indices on a tape cartridge, according to various embodiments. A computer system 500 may include a tape drive 510, and a tape controller 514. The tape drive 510 may position the tape medium 508 of the tape cartridge 520 using a variety of components, including a tape transport servo system 524 of a tape drive 510 and a track follow system. The tape medium 508 may be any magnetic-based storage. In an embodiment, the tape medium 508 may be formatted with a linear tape file system (LTFS). The table Tape controller 514 includes an LTFS 518, which acts to format the tape medium to include an index partition (IP) and a data partition (DP).

The tape medium travels through one or more rollers on the tape drive. The tape transport servo system 524 of the tape drive 510 may include the servomotors, the reels, e.g., take-up reel and cartridge reel, the rollers, e.g., 507, 505, 503, 501, and the tape transport control module 502, which may maintain a constant tape medium 508 velocity. The tape transport servo system 524 controls the velocity of the tape medium 508 during read, write, and seek operations as well as the tension applied to the tape through the rollers.

A particular data rate requirement may necessitate the use of higher tape transport velocities. At the same time, data rate matching also may impose a requirement for reliable operation at very low tape velocities. Furthermore, tight control of tension is may be necessary for supporting thinner tape, thereby and may enabling an increase in volumetric storage density and mitigating mitigate lateral tape motion. The A reduction in tape thickness renders the tape more fragile and hence more sensitive to tension variations.

The rollers 501, 503, 505, 507, may maintain the track of the tape medium and provide the tension to produce a consistent tape medium velocity. Each roller may be roughly identical to another roller, e.g., roller 501 may be 10 mm while roller 505 may be 10.01 mm. In various embodiments, the rollers may be of different sizes. As the tape medium 508 moves through the rollers, the microscopic differences between each roller may result in increased lateral movement. The track follow system may act to compensate the lateral movement.

The A track follow system, included in a tape drive, may include the a track follow control, such as track follow control 504, which may control the lateral/rotational position of the a tape 508 with respect to a tape head, such as head 512, the tape medium 508 during read and write operations of the head 512. The tape head 512 may be a module for reading information on the tape medium 508 as well as writing (recording) data sets and indices on the tape medium. The read and write operations may be communicated through a communications pathway 530. The communications pathway 530 may start at the analog front-end servo channel 506 pass through the track follow control 504 to the head 512. The head 512 may perform read or write operations on the tape 508 and send read and/or conformation of the written data back through the communications pathway 530 back to the analog front-end servo channel 506. The tape cartridge 520 may also include cartridge memory (CM) 522. The CM 522 may be a tape memory, which may store information regarding the locations of indexes stored on the IP. The CM may access the indexes stored on the IP to determine the locations of DS stored on the DP of the tape medium 508. The CM 522 may store information of the tape cartridge 520 on the tape medium 508, which may include locations of the start of an IP and or a DP. A function of the track following control system 504 is may be to reduce the misalignment between of the tape 508 and the head 512, which may be created by lateral motion of the flexible tape medium. Lateral tape motion (LTM) may arise from imperfections in the tape guide rollers, such as rollers 501, 503, 505, 507, and reels, such as runouts, eccentricities, or and other tape path imperfections.

Both the tape transport control 502 and the track follow control 504 may receive positional data of the tape stored on the cartridge memory 522 from the head 512. The head 512 may read the tape medium 508 and send data to the analog front-end servo channel 506. The analog front-end servo channel 506 may pass correction signals to both the tape transport control 502 and the track follow control 504. The An analog front-end servo channel 506 of a tape drive system 510 is may be a signal processing unit and may derive essential servo parameters—such as tape velocity, lateral head position, and longitudinal tape position—from patterns that are written onto tape during its manufacture.

The analog front-end servo channel 506 may determine the write position on the positional data from the head 512. For instance, the position may be an (actual) position on a tape that may be sensed by markers on the tape or by sensors on the take up reels, or other components of the tape path. The write position may also be a position of the head 512 relative to the tape. For instance, servos (piezoelectric or similar) may be used to move the head 512 in a desired direction to adjust to the predicted positional variance of the tape. Aspects of the disclosure may relate to determining the location of a data set stored on a DP of a tape cartridge.

The write position module 516 may determine the location of the data set and a position to write the index on the IP. If the index to be written on the IP is a distance proximate to the data set or a backup index stored on the DP, then the dummy index may be written. The write position module 516 may monitor the tape medium 508 continuously, to determine such things as proximity of data set, indices, and backup indices and, upon receiving a request to write an index, will write the dummy index accordingly.

Figure 6:
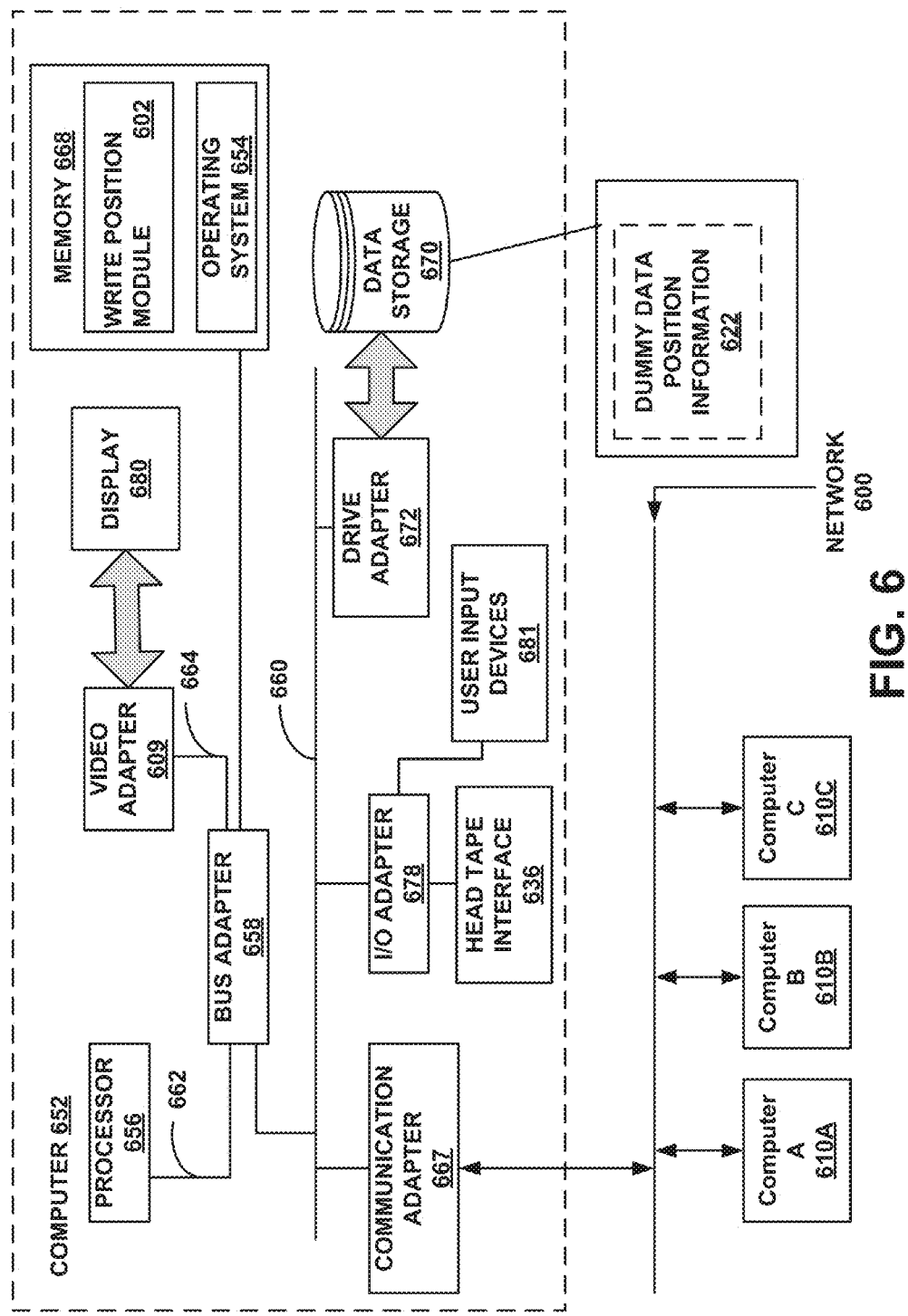
FIG. 6 illustrates a block diagram of automated computing machinery, according to various embodiments.

FIG. 6 illustrates a block diagram of automated computing machinery, according to various embodiments. According to various embodiments, the computing machinery may correspond to the tape controller 514 of FIG. 5. The computing machinery may include an example computer 652, which may perform aspects of the disclosure in various embodiments. The computer 652 of FIG. 6 includes at least one processor 656 ('CPU') as well as a memory 668 (for example, random access memory (RAM)) which is connected through a bus adapter 658 to the CPU 656 and to other components of the computer 652.

The memory 668 includes a write position module 602 and an operating system 654. The write position module 602 may communicate with the tape controller 514 (FIG. 5) to determine the location of the DP, positions of data set of the DP, and backup indices of the DP. The write position module 602 may be used in conjunction with the write position module 514 and the CM 522 (FIG. 5) of the tape cartridge 520. The write position module 602 may read the storage information on the CM to determine the locations of the indexes and metadata stored on the CM to determine the locations of data sets and backup indexes stored on the DP. The operating system 654, which may interact with a user in operating the computer 652. The operating system 654 is shown in memory 668, but many components of such software typically are stored in non-volatile memory also, such as, for example, on a data storage 670 such as a disk drive.

The computer 652 also includes a disk drive adapter 672 coupled through expansion bus 660 and bus adapter 658 to the processor 656 and other components of the computer 652. Disk drive adapter 672 connects data storage to the computer 652 in the form of disk drive 670. The data storage 670 may include one or more storage devices. The data storage 670 may be configured to store information relating to creating dummy index position information 622. The dummy index position information 622 may include code or instructions for writing the dummy index on the tape of a CM.

The computer 652 includes an input/output (I/O) adapter 678, and embodiments may include more than one such I/O adapter. I/O adapters implement user-oriented input/output through, for example, software drivers and computer hardware for controlling output to display devices such as computer display screens, as well as user input from user input devices 681 such as keyboards and mice. The I/O adapters 678 is connected to the head tape interface 636, which may send, through the I/O adapter, an analog signal to the computer 652 for processing by the write position module 602. The example computer 652 includes a video adapter 609, which is an example of an I/O adapter specially designed for graphic output to a display device 680 such as a display screen or computer monitor. Video adapter 609 is connected to processor 656 through a high-speed video bus 664, bus adapter 658, and the front side bus 662, which is also a high-speed bus.

The example computer 652 includes a communications adapter 667 for data communications with other computers (computers 610A-610C), e.g., mobile devices, and for data communications with a data communications network 600. Such data communications may be carried out serially, for example, through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring to FIG. 6, the present disclosure may be embodied in a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for storing data on a storage medium, the method comprising:
   receiving a request for writing a first index information to a first partition of a tape medium of a tape drive, the tape medium including:
   the first partition for writing the first index information starting at a first index position,
   a second partition for storing a data set, the data set including a second index information starting at a second index position,
   a non-volatile memory for storing the second index position, and
   a module for writing the first index position;
   writing a beginning portion of the first index information on the first partition at the first index position;
   determining whether the beginning portion of the first index information is proximate to the second index position;
   registering, in response to the determining that the beginning portion of the first index information is proximate to the second index position, an interrupted index position; and
   writing a dummy index to the first partition starting at the interrupted index position to create a physical misalignment between the first index information on the first index partition and the second index information on the second partition.

2. The method of claim 1, wherein the dummy index overlaps the second index information.

3. The method of claim 1, wherein the determining whether the beginning portion of the first index information is proximate to the second index position includes:
   determining, based on the first index information, the first index position, and the second index position, that the first index would at least partially overlap the second index if written continuously starting at the first index position.

4. The method of claim 1, wherein the beginning portion of the first index information starts at the first index position and ends at the interrupted index position, wherein the beginning portion does not overlap with the second index information, the method further comprising:
   writing a second portion of the first index information to the first partition from a restarted index position to an end index position, wherein the restarted index position follows the dummy index, and wherein the second portion does not overlap with the second index information.

5. The method of claim 1, wherein the first index information includes the second index information and a second partition information, the second partition information directing the first index information to the second index information stored on the second partition.

6. The method of claim 1, wherein the determining whether the beginning portion of the first index information is proximate to the second index position includes:
   determining that the index position of the first index information is within a threshold distance of the index position of the second index information.

7. The method of claim 6, wherein the threshold distance of the second index information is within 10 centimeters of magnetic tape.

8. The method of claim 1, wherein the first partition is an index partition and the second partition is a data partition in a linear tape file system.

9. The method of claim 1, wherein the first partition is encrypted using an encryption key.

10. The method of claim 1, the method further comprising:
    determining a length of dummy data to write as the dummy index following the interrupted index position, the length of dummy data being at least an amount necessary to create the physical misalignment between the first index information on the first partition and the second index information on the second partition.

11. A system for storing data on a storage medium, the system comprising:
    a memory;
    a processing unit communicatively coupled to the memory;

a storage system communicatively coupled to the processing unit and the memory, the storage system including a tape storage medium, the tape storage medium comprising:
- an index partition for writing a first index information starting at a first index position,
- a data partition for storing a data set, the data set including a second index information starting at a second index position,
- a non-volatile memory for storing the second index position, and
- a module for recording the first index position; and a tape controller, communicatively coupled to the storage system, configured to:
- receive a request for writing the first index information to the index partition;
- write a beginning portion of the first index information on the index partition at the first index position;
- determine whether the beginning portion of the first index information is proximate to the second index position;
- register, in response to the determining that the beginning portion of the first index information is proximate to the second index position, an interrupted index position; and
- write a dummy index to the index partition starting at the interrupted index position to create a physical misalignment between the first index information on the index partition and the second index information on the data partition.

12. The system of claim 11, wherein the determining whether the beginning portion of the first index information is proximate to the second index position includes:
- determining that the first index information starts at the first index position and ends at an end index position.

13. The system of claim 11, wherein the beginning portion of the first index information starts at the first index position and ends at the interrupted index position, wherein the beginning portion does not overlap with the second index information, and wherein the tape controller is further configured to:
- write a second portion of the first index information to the index partition from a restarted index position to an end index position, wherein the restarted index position follows the dummy index, and wherein the second portion does not overlap with the second index information.

14. The system of claim 11, wherein the tape controller is further configured to:
- determine a length of dummy data to write as the dummy index following the interrupted index position, the length of dummy data being at least an amount necessary to create the physical misalignment between the first index information on the index partition and the second index information on the data partition.

15. A computer program product for storing data on a storage medium, comprising a computer readable storage medium having a computer readable program stored therein, wherein the computer readable program, when executed on a computing device, causes the computing device to:
- receive a request for writing a first index information to a first partition of a serial storage medium of a serial storage system, the serial storage medium including:
  - the first partition for writing the first index information starting at a first index position,
  - a second partition for storing a data set, the data set including a second index information starting at a second index position,
  - a non-volatile memory for storing the second index position, and
  - a module for recording the first index position;
- write a beginning portion of the first index information on the first partition at the first index position;
- determine whether the beginning portion of the first index information is proximate to the second index position;
- register, in response to the determining that the beginning portion of the first index information is proximate to the second index position, an interrupted index position; and
- write a dummy index to the first partition starting at the interrupted index position to create a physical misalignment between the first index information and the second index information.

16. The computer program product of claim 15, wherein the determining whether the beginning portion of the first index information is proximate to the second index position includes:
- determining that the first index information starts at the first index position and ends at an end position.

17. The computer program product of claim 15, wherein the beginning portion of the first index information starts at the first index position and ends at the interrupted index position, wherein the beginning portion does not overlap with the second index information, and wherein the computing device is further configured to:
- write a second portion of the first index information to the first partition from a restarted index position to an end index position, wherein the restarted index position follows the dummy index, and wherein the second portion does not overlap with the second index information.

18. The computer program product of claim 15, the computer program product further comprising:
- determining a length of dummy data to write as the dummy index following the interrupted index position, the length of dummy data being at least an amount necessary to create the physical misalignment between the first index information on the first partition and the second index information on the second partition.

* * * * *